United States Patent [19]

Rubin et al.

[11] Patent Number: 5,451,961
[45] Date of Patent: Sep. 19, 1995

[54] TIME VARYING ADAPTIVE CLUTTER FILTER AND CLUTTER RESIDUE SENSOR

[75] Inventors: William L. Rubin, Whitestone; Jeffrey J. Owenburg, Bethpage, both of N.Y.

[73] Assignee: Unisys Corporation, Blue Bell, Pa.

[21] Appl. No.: 148,447

[22] Filed: Nov. 8, 1993

[51] Int. Cl.⁶ ...................... G01S 7/292; G01S 13/95
[52] U.S. Cl. .................... 342/159; 342/162; 342/26; 342/189
[58] Field of Search .............. 342/159, 162, 26, 460, 342/189, 194, 195

[56] References Cited

U.S. PATENT DOCUMENTS

| | | | |
|---|---|---|---|
| 3,869,601 | 3/1975 | Metcalf | 342/41 X |
| 4,719,466 | 1/1988 | Fama et al. | 32/159 |
| 4,719,649 | 1/1988 | Woodsum et al. | 455/1 |
| 4,728,952 | 3/1988 | Residois | 342/26 |
| 4,811,020 | 3/1989 | Montheil | 342/159 |
| 5,061,934 | 10/1991 | Brown et al. | 342/162 |
| 5,101,210 | 3/1992 | Milan | 342/159 |
| 5,157,402 | 10/1992 | Zagar et al. | 342/104 |
| 5,175,551 | 12/1992 | Rubin | 342/26 |
| 5,177,487 | 1/1993 | Taylor, Jr. et al. | 342/159 |
| 5,179,542 | 1/1993 | Reese et al. | 367/135 |
| 5,257,028 | 10/1993 | Keydel et al. | 342/25 |
| 5,323,161 | 6/1994 | Gailer et al. | 342/13 |
| 5,327,141 | 7/1994 | Sheldon | 342/159 |
| 5,337,055 | 8/1994 | Ghignoni | 342/93 |
| 5,357,256 | 10/1994 | Peperone | 342/160 |

*Primary Examiner*—John B. Sotomayor
*Attorney, Agent, or Firm*—Seymour Levine; Stanton D. Weinstein; Mark T. Starr

[57] ABSTRACT

Clutter reduction is accomplished by dividing the sampling times of received radar signals into blocks containing a plurality of sampling times. The average clutter value in each block is estimated by averaging the signal returns for the sampling times in the block. Block average clutter values are time positioned at a selected sampling time position in a block and a smooth function with continuous first and second derivatives is passed through the average clutter value points. In a preferred embodiment the smooth function is a cubic spline comprising third order polynomial segments between average clutter value points. Clutter values at the sampling points are extracted from the smooth function and respectively subtracted from the received radar signals. A clutter sensor examines the resulting radar signals for clutter distortion and eliminates radar signals that are not substantially clutter free.

13 Claims, 3 Drawing Sheets

TIME VARYING ADAPTIVE CLUTTER FILTER AND CLUTTER RESIDUE SENSOR

BACKGROUND OF THE INVENTION

1. Field of the Invention

The invention relates to radar signal reception and more particularly to clutter suppression for received radar signals.

2. Description of the Prior Art

The primary function of a weather radar system is to provide accurate estimates of the first three spectral moments: hydrometeor reflectivity, mean radial velocity, and doppler spectral width. It is well known that ground clutter seriously biases the radar estimates of these first three spectral moments of radar weather returns. Consequently, clutter suppression is essential when accurate spectral moment estimates are desired. Some clutter suppression techniques employed in the prior art tend to distort the radar signal spectrum, thereby biasing the weather radar signal spectral moment estimates and defeating the clutter suppression purpose.

Clutter reduction techniques exist for coherent and non-coherent radar systems. The clutter reduction techniques of the prior art for non-coherent radars provide less effective clutter suppression than do clutter reduction techniques of the prior art for coherent radars. Hence, the discussion to follow will be limited to coherent radar systems and clutter reduction techniques for suppressing clutter in such systems.

A frequently used coherent weather radar technique for Suppressing clutter passes coherently detected I and Q components of a temporal signal series through time-invariant high pass filters with clutter rejection bands around zero frequency. To preclude weather spectral distortion by the clutter filter, the lowest frequency in the weather spectra is positioned in the pass band of the filter at a frequency that is at least three times the 3 dB cut-off frequency of the filter. Clutter filters employed in the prior art systems are of two classes, finite impulse response (FIR) and infinite impulse response (IIR) time-invariant high pass filters. Time-invariant high pass filter design is straight forward. In these designs, steady state filter parameters are selected to achieve a specified stopband attenuation, stopband width, transition bandwidth, and passband ripple.

In weather radars, time-invariant high pass filters often perform more poorly than expected. Since time-invariant filters are designed on the basis of a received infinite pulse train, realized clutter attenuation for an actual finite pulse train, coupled to a weather radar receiver, may be less than the specified filter stopband attenuation. For example, it is not uncommon for an IIR filter designed for 50 dB stopband attenuation, operating on a finite length pulse train, to provide only 20 dB attenuation in the stopband.

A weather radar clutter suppression technique, of the prior art, which may provide greater clutter rejection than that provided by FIR and IIR filters, compares the shape and amplitude of the received signal autocorrelation function to the shape and amplitude of the autocorrelation functions of assumed models of weather and clutter to estimate the spectral moments of the received weather and clutter signals. This technique requires accurate models of clutter and weather signal returns. These models are difficult to achieve with sufficient accuracy to provide desired weather moment estimate accuracies.

A related technique compares the spectral shape of the received signal-plus-clutter to shapes of postulated signal-plus-clutter curves to extract the weather spectral moments. The accuracy of this technique depends on the accuracy of the assumed signal plus clutter models. Spectral modelling of signal plus clutter is no less difficult than that of autocorrelation modeling of weather plus clutter returns.

A clutter suppression technique which extracts an accurate representation of the clutter signal from signal plus noise is needed to provide accurate weather spectral moments from which accurate weather conditions can be determined.

SUMMARY OF THE INVENTION

In accordance with the invention, a weather radar receiver provides coherently detected I and Q components of a temporal signal series with sample amplitudes that vary with time at a Doppler frequency related to the mean radial component of the weather scatterer velocities. I and Q are the in-phase and quadrature components of the temporal signal relative to a reference signal, generally the receiver local oscillator. Superimposed on this relatively slow mean weather velocity Doppler amplitude variation is a rapid sample-to-sample Rayleigh fluctuation that is characteristic of the random nature of the weather return. Since the I and Q time series of the weather signal Doppler return are generally sinusoidal, the time average of the I and Q temporal series over a sufficiently long interval approaches zero.

Clutter modifies the weather radar signal temporal pulse train return. For simplicity of analysis, consider the contribution of a single discrete stationary point scatterer. As the antenna of the radar system scans by a discrete clutter point, the I and Q time series due to weather will be superimposed on a slowly varying time series related to the two way radar antenna pattern. In general the return from several clutter scatters will overlap in time, each having a different phase angle. The interaction of these signals provides a waveform that varies more rapidly than the waveform of a single point clutter return. This time varying clutter waveform component has an amplitude which may exceed the weather radar return by 30–50 dB. Thus it is required to extract a signal with an energy level that is $10^{-5}$ to $10^{-3}$ below the energy of the signal on which it is superimposed. Optimal clutter suppression requires eliminating the time varying clutter component with minimal distortion of the weather signal component.

In accordance with the invention, clutter is suppressed by estimating the I and Q time-varying signal components due to clutter and respectively subtracting these estimates from each I and Q temporal series. This technique suppresses clutter more effectively than time-invariant filters and generates less weather spectrum distortion than time-invariant filters when the frequency separation of the weather spectrum from the clutter spectrum is less than three times the clutter spectral width.

Additionally, the invention provides means for determining when weather moment estimates are inaccurate due to residual clutter, thereby permitting such estimates to be censored. This is particularly important when the weather spectral moments are computed by pulse-pair processing (PPP). PPP does not use frequency selective means, appropriate filtering being performed prior to the processing, and is therefore particularly sensitive to clutter bias errors.

When clutter is not present, weather radar returns from distributed hydrometeors is accurately characterized by a stationary two-dimensional Gaussian random process with zero mean. The random process becomes non-stationary when clutter is present, since the process then has a time-varying mean.

A scanning land-based radar usually receives its strongest clutter return from discrete stationary scatterers such as buildings and mountain sides. The clutter in this case has a narrow spectrum about zero and no spectral "tails". The spectrum due to multiple small scatterers such as tree branches and ocean waves that move with the wind typically has spectral "tails" and a wider spectrum. In either case the invention removes the clutter generated time-varying mean to yield stationary I and Q series which are then processed for weather spectral parameters as a two dimensional Gaussian random process with zero mean.

In a preferred implementation of the invention the I and Q time series, derived from signals received during a dwell period, are processed separately, but identically. Each of the time series are divided into sequential blocks. The average signal value of each block is computed and a cubic spline approximating function which passes through these average values is generated. The cubic spline approximating function in each block is an accurate estimate of the instantaneous clutter signal contribution to the each sample in the block. These estimated time varying clutter signal contributions to both the I and Q time series differ from the true clutter signal contributions by at most the integrated I and Q weather signal samples within one half of a Doppler sinusoid divided by the number of I and Q samples averaged in a block. I and Q weather signal values, substantially free of clutter, are then estimated by respectively subtracting the I and Q cubic spline clutter approximating function values from the I and Q values at the radar signal sample positions.

DESCRIPTION OF THE PREFERRED EMBODIMENTS

Figure 1:
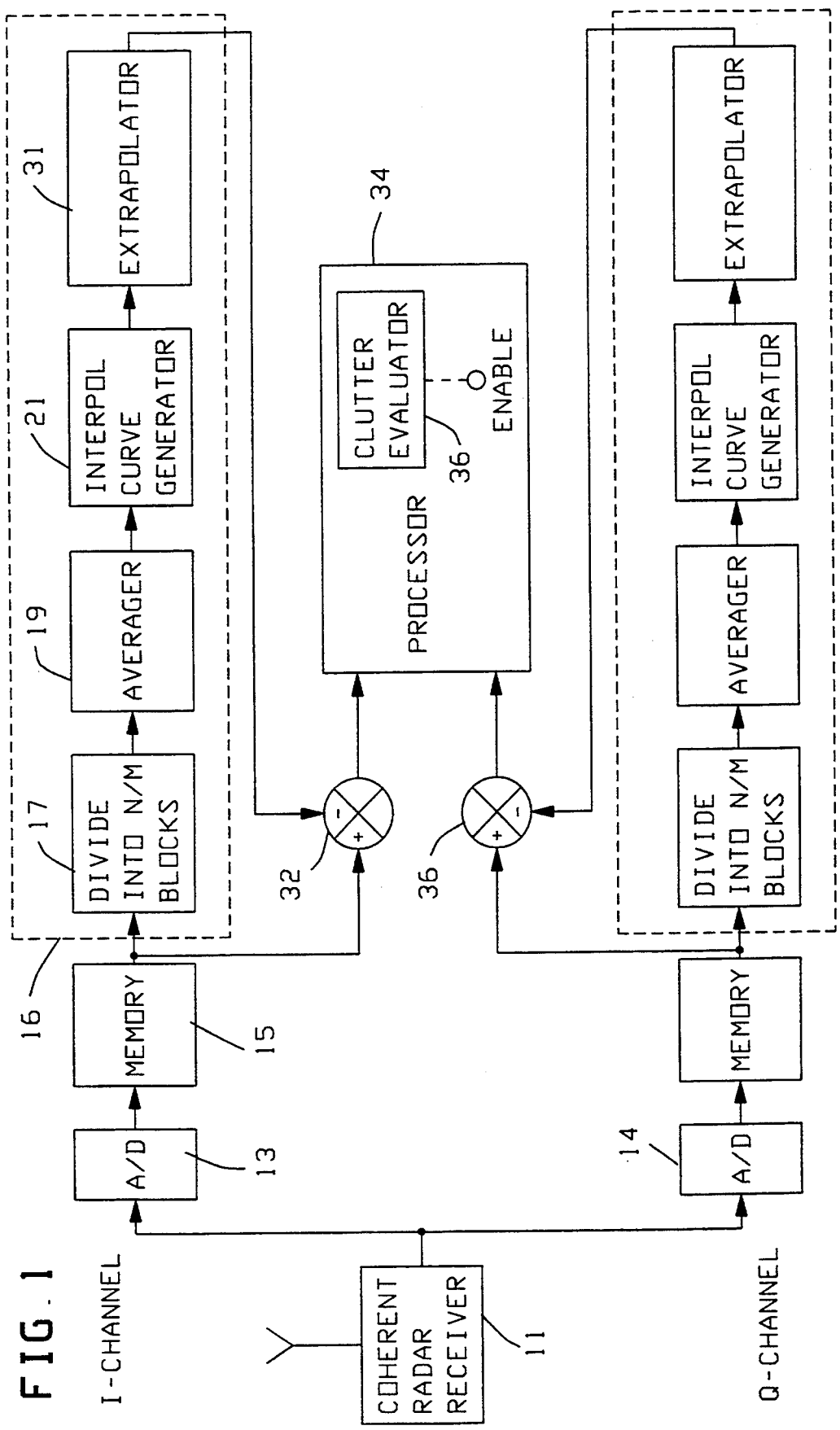
FIG. 1 is a block diagram of a preferred embodiment of the invention.

Refer now FIG. 1. Pulses of the weather radar return signals are received by a coherent radar receiver 11 wherefrom signals (I) in-phase with the coherent receiver 11 local oscillator are coupled to an analog-to-digital (A/D) converter 13, while signals in quadrature (Q) are coupled to a second A/D converter 14. The digital signals from the A/D converters 13 and 14 are identically processed. Therefore, for the sake of brevity, only the processing of the I channel will be described. The digital amplitude samples of the received radar pulses are stored in a memory 15 in manner that maintains the received sequence. The stored samples are coupled to a clutter estimator 16 wherefrom an accurate estimate of the clutter amplitude contribution to each received sample is provided. The clutter estimator includes an arranging network 17 which receives the NxM amplitude samples and divides the samples into N consecutive blocks of M samples. The division of the samples into the N consecutive blocks is performed in a manner that maintains the samples in the received pulse sequence. The blocks of M samples are coupled to an averaging network 19 wherein the average amplitude of each block is determined.

As previously stated, the weather signal samples vary in amplitude approximately sinusoidally at the received signal Doppler frequency. Hence, the average signal value in each block is a fairly accurate estimate of the clutter signal contribution to the samples used to generate the average in the block. The estimated clutter signal average in each block differs from the true clutter signal average by at most the integrated weather signal samples contained in one half of a Doppler frequency cycle divided by the number of samples averaged in a block. The average value of the M samples within each block are positioned at the center of the block and coupled to an interpolation generator 21 wherein an interpolation curve is generated which approximates the instantaneous received clutter signal values within each block.

An accurate estimate of the instantaneous clutter values in each block is generated by a continuous curve which passes through the estimated clutter signal average values in each block and has continuous first and second derivatives. The approximating function which generates this curve is known in the art as a cubic spline. A cubic spline is defined by a different third degree (cubic) polynomial within each of (N-1) intervals between the time positions of the N average values. The coefficients of these cubic polynomials are established by the requirement that the approximating curve be continuous with continuous first and second derivatives over the (N-1) intervals.

Figure 2:
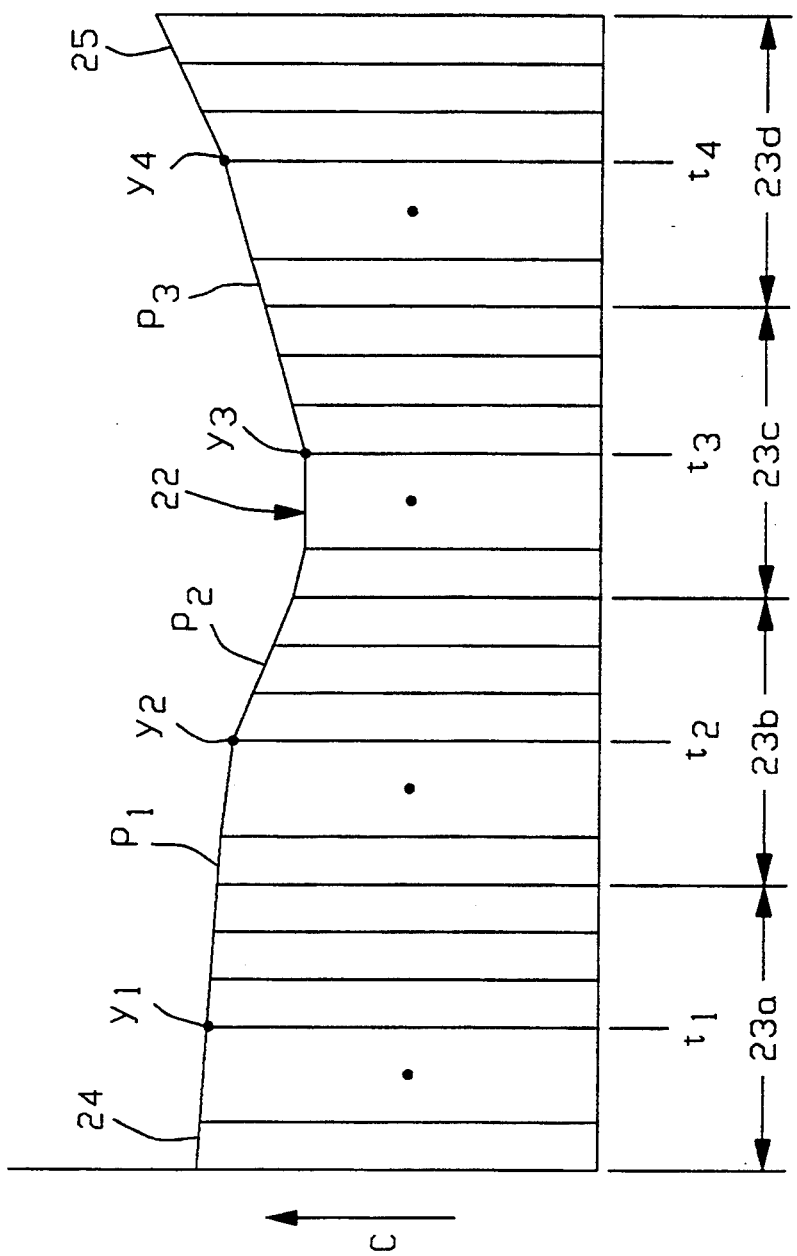
FIG. 2 is a graph useful for the explanation of the interpolation procedure that may be utilized to estimate clutter values.

As an example, a cubic spline function passing through four average clutter values $y_1$-$y_4$, respectively centered in four blocks of received radar pulses 23a-23d at received pulse times $t_1$-$t_4$ as shown in FIG. 2, may be defined by the four average clutter values as follows:

$$y_1 = f(t_1) \quad y_2 = f(t_2) \quad y_3 = f(t_3) \quad y_4 = f(t_4)$$

Cubic functions in the intervals between $t_1$-$t_2$, $t_2$-$t_3$, $t_3$-$t_4$, which approximate the function $f(t)$ may be represented by:

$$P_1(t) = a_{10} + a_{11}t + a_{12}t^2 + a_{13}t^3 + a_{14}t^4 \quad t_1 \leq t \leq t_2$$

$$P_2(t) = a_{20} + a_{21}t + a_{22}t^2 + a_{23}t^3 + a_{24}t^4 \quad t_2 \leq t \leq t_3$$

$$P_3(t) = a_{30} + a_{31}t + a_{32}t^2 + a_{33}t^3 + a_{34}t^4 \quad t_3 \leq t \leq t_4$$

It should be evident that there are four (4) unknown parameters for each segment of the approximation and twelve (12) all told. Six (6) constraints are imposed at the average clutter value points since:

$$P_1(t_1) = y_1 \quad P_1(t_2) = y_2 \quad P_2(t_2) = y_2$$

$$P_2(t_3) = y_3 \quad P_3(t_3) = y_3 \quad P_3(t_4) = y_4$$

An additional four constraints are imposed by the requirement that the function f(t) must have continuous first and second derivatives. Thus:

$$P_1'(t_2)=P_2'(t_2)=P_2'(t_3)=P_3'(t_3)$$

$$P_1''(t_2)=P_2''(t_2) \; P_2''(t_3)=P_3''(t_3)$$

Thus there are ten (10) equations and twelve (12) unknown parameters. Consequently there is a two parameter family of possible solutions. Two further conditions are required for a unique solution. These two may be taken as the boundary conditions at $t_1$ and $t_4$. Two sets of boundary conditions are most commonly used:
  (i) set $y''(t_1)$ and $y''(t_2)$ equal to zero establishing what is referred to in the art as a natural spline, and
  (ii) specifying values for $y'(t_1)$ and $y'(t_4)$ and determining $y''(t_1)$ and $y''(t_2)$ consistent with the specified slopes.

For purposes of the invention the natural spline has been chosen. In this case, the slope at the end points $t_1$ and $t_4$ are extended from the end points of the cubic spline, thereby establishing a linear extension 24 from the beginning of the first block 23a to the time $t_1$ and a linear extension 25 from the time $t_4$ to the end of the fourth block 23d.

Though the above describes the generation of a cubic spline through four points, it should be recognized that the technique presented may be utilized to generate cubic splines through any number of points. A comprehensive treatment of cubic splines is given by Press, William H., et al 1988 "Numerical Recipes (The Art of Scientific Computing) (Fortran Version)" Cambridge University Press, pages 86–89, which is incorporated herein by reference.

Refer again to FIG. 1. The instantaneous clutter contributions to each sample, as for example sample 27 in FIG. 2, are determined by reading the cubic spline value at the sample time. An extrapolator 31 extracts the clutter values at each sample time (received pulse time) from the amplitude versus time cubic spline provided by the cubic spline generator 21. The clutter values extrapolated from the cubic spline are coupled to a differencing network 32 wherein the extrapolated clutter level for a given received pulse is subtracted from the amplitude of the corresponding received pulse stored in memory 15. After subtracting the clutter from the in-phase component of the received signal, the differencing network 32 couples a substantially clutter free I component of the radar weather return signal to a processor 34, which also receives a clutter free Q component from a differencing network 36 of the Q component processing channel. Processor 34 combines the I and Q substantially clutter free radar weather return components to establish a substantially clutter free radar weather return signal which may then be further processed to establish the weather radar spectral parameters.

At times clutter in a range bin is so great that it can not be entirely removed by the above process to provide a substantially clutter free radar weather return signal. Processing clutter contaminated weather radar signals provides inaccurate meteorological parameters. It is therefore desirable to evaluate the radar weather return signal obtained by combining the I and Q signals coupled to the processor to determine if clutter contamination is present.

It is well known that the power spectrum and autocorrelation functions are Fourier transform pairs. Further, the autocorrelation function of a received signal is the sum of the clutter and weather autocorrelation functions. Additionally, it has been experimentally demonstrated that the shape of the magnitude versus lag for the weather autocorrelation function is Gaussian, particularly in the region around its peak. The magnitude of the clutter autocorrelation function is typically not Gaussian and, due to its narrow frequency spectrum centered about zero, has a much wider autocorrelation spectrum than the autocorrelation function of the weather return signals.

When the clutter has not been completely suppressed or if the weather spectrum has been significantly distorted by the clutter filter, the shape of the autocorrelation function magnitude of the clutter suppressed I,Q time series will not be Gaussian, particularly around its peak. When the distortion exceeds a pre-determined amount, it is desirable to censor the weather moments for the affected range bin.

The magnitude of the received weather signal autocorrelation function $R(\tau)$ is a real and even function of $\tau$. Around its peak at $\tau=0$ it can be approximated by the first two terms of a MacLaurin expansion:

$$R(\tau)=R(0)+(\tfrac{1}{2})\tau^2 R''(0)$$

where $R''(O)$ is the second derivative of the $R(\tau)$ evaluated at $\tau=O$ and $R(O)$ is the value of $R(\tau)$ also evaluated at $\tau=O$. For white Gaussian receiver noise, $R(O)=R_{so}+R_{no}$, where $R_{so}$ is the signal component and $R_{no}$ is the noise component of $R(O)$. Noise component $R_{no}$ is a Dirac delta function which has a non-zero value only at $\tau=O$ and does not contribute to the signal portion of $R(\tau)$ for $\tau$ not equal to O. Hence for $\tau \neq 0$, $$R(\tau)=R_{so}+(\tfrac{1}{2})\tau^2 R''(0)$$

Since $R(\tau)$ is non-zero only for $\tau=mT$ (m=0,1,2,3 . . . ), the MacLaurin expansion can be rewritten as:

$$R(mT)=R_{so}+(\tfrac{1}{2})(mT)^2 R''(0)$$

For m=1 and m=3:

$$R(T)=R_{so}+(\tfrac{1}{2})(T)^2 R''(0)$$

$$R(3T)=R_{so}+(\tfrac{1}{2})(3T)^2 R''(0)$$

Solving these two equations for R results in:

$$(R_{so})_{13}=[9R(T)-R(3T)]/8$$

Where the notation $(R_{so})_{13}$ indicates that the value of $R_{so}$ is derived from the values of $R(\tau)$ for $\tau=T$ and $3T$. Repeating for m=2 and m=4 results in:

$$(R_{so})_{24}=[4R(2T)-R(4T)]/3$$

When $(R_{so})_{13} \neq (R_{so})_{24}$ it is an indication that the processed output signal autocorrelation function magnitude is not Gaussian. This can be restated as follows. When, $$(1/k) > |(R_{so})_{13}/(R_{so})_{24}| > k$$

where k is chosen in accordance with a desired estimation accuracy, weather moment estimates for the affected range bin should be censored.

Figure 3:
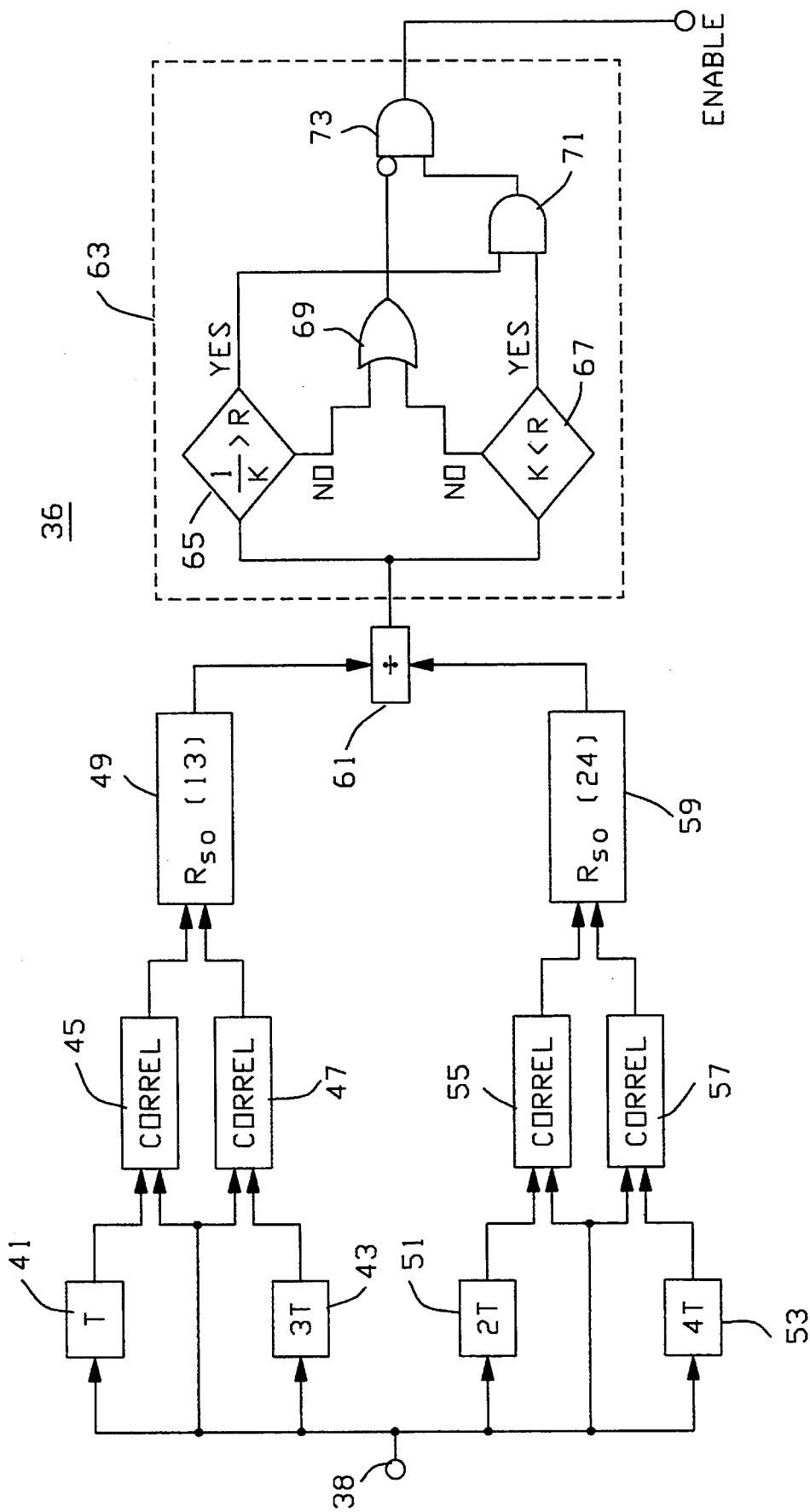
FIG. 3 is a block diagram of a clutter contamination detector.

Refer now to FIG. 3, wherein a block diagram of a clutter evaluator 36, which may be employed in processor 34 of FIG. 1, is shown. The weather return signal established by combining the I and Q components from differencing networks 32 and 36 (FIG. 1) is coupled to a terminal 38 for autocorrelation. This signal is given lags 1 and 3 in delay lines 41 and 43 and coupled to correlators 45 and 47 respectively, wherein the autocorrelations with the undelayed signal at terminal 38 are determined. The autocorrelations for lags 1 and 3 are coupled from the correlators 45 and 47 to a processor 49 which provides the value $(R_{so})_{13}$. Similarly, the signal at terminal 38 is coupled to delay lines 51 and 53 which respectively provide lags 2 and 4. These delayed signals are respectively coupled to correlators 55 and 57 wherein the autocorrelations with the undelayed signal at terminal 38 are taken and coupled to a processor 59 which provides the value $(R_{so})_{24}$. The values $(R_{so})_{13}$ and $(R_{so})_{24}$ are coupled to divider network 61 wherefrom the ratio R of $(R_{so})_{13}$ to $(R_{so})_{24}$ is coupled to a logic circuit 63. If R is less than a chosen value, k a high level signal is coupled from decision network 67 to an OR gate 69. If R is greater than k, a high level signal is coupled an AND gate 71. If R is greater than 1/k, a high level signal is coupled to OR gate 69. If R is less than 1/k, a high level signal is coupled to AND gate 71. Thus if R satisfies $1/k > R > k$, two high level signals are coupled to AND gate 71, thereby providing a high level signal to AND gate 73 and two low level signals are provided to OR gate 69, thereby providing a low level signal to an inversion terminal at AND gate 73. Thus an enabling high level signal is coupled to enable circuits of the processor 34 (FIG. 1). It should be apparent that if $R > 1/k$ or $R < k$ a high level signal is coupled to the inversion terminal of AND gate 73 causing a low level signal to be coupled to the enabling circuits of processor 34 thereby causing processor 34 to suppress the clutter reduced signal for the corresponding received pulse.

Though the invention has been described in terms of a weather radar system, it should understood that this clutter suppression invention may be utilized in all radar systems wherein clutter is a problem.

While the invention has been described in its preferred embodiments, it is to be understood that the words which have been used are words of description rather than limitation and that changes may be made within the purview of the appended claims without departing from the true scope and spirit of the invention in its broader aspects.

We claim:

1. A clutter reduction apparatus having means for receiving radar signal plus clutter returns, means coupled to the receiving means for sampling the radar signal plus clutter returns and providing a plurality of samples at a plurality of sample times, means coupled to the sampling means for storing the plurality of samples, means coupled to the storing means for determining the clutter component of each received radar signal plus clutter return, and means coupled to the storing means and the determining means for respectively subtracting the clutter components from said radar signal plus clutter returns, thereby providing a clutter reduced radar signal characterized in that the determining means comprises:

means coupled to said storing means for dividing said plurality of samples into a multiplicity of sample blocks each containing at least two radar signal plus clutter return samples, said multiplicity of sample blocks having a first sample block and an ultimate sample block;

means coupled to said dividing means for providing an average clutter value of said plurality of radar signal plus clutter returns in each sample block and for respectively positioning said average clutter value for a sample block at a selected sample time position therein;

means coupled to said providing means for generating a smooth function through each average clutter value; and means coupled to said generating means for extrapolating said clutter component for each radar signal plus clutter return.

2. A clutter reduction apparatus in accordance with claim 1 wherein said selected sample time position is centered in said block.

3. A clutter reduction apparatus in accordance with claim 1 wherein said smooth function has continuous first and second derivatives.

4. A clutter reduction apparatus in accordance with claim 3 wherein said smooth function is a cubic spline having third order polynomial approximations between said average clutter values.

5. A clutter reduction apparatus in accordance with claim 4 wherein said cubic spline has a zero first derivative from a first sample time position in said first block to said selected sample time position in said first block and a zero first derivative from said selected sample time position in said ultimate block to an ultimate sample time position in said ultimate block.

6. A clutter reduction apparatus of the type having means for receiving a radar signal, having a radar signal component and a clutter component and means coupled to the receiving means for determining the clutter component of received radar signal and subtracting the determined clutter component from the radar signal, thereby providing a clutter reduced radar signals, comprising:

means coupled to receive said clutter reduced radar signal for providing autocorrelations of said clutter reduced radar signal for a first set of two autocorrelation lags;

means coupled to receive said autocorrelations for said first set of autocorrelation lags for providing a first radar signal;

means coupled to receive said clutter reduced radar signal for providing autocorrelations of said clutter reduced radar signal for a second set of autocorrelation lags, said second set having lags that differ from those of said first set; and means coupled to receive said autocorrelations for said second set of autocorrelation lags for providing a second radar signal;

means coupled to receive said first and second radar signals for determining a ratio thereof; and means coupled to receive said ratio for evaluating clutter component distortion of said radar signal.

7. A clutter reduction apparatus in accordance with claim 6 wherein said first set of autocorrelation lags comprises lags 1 and 3 and said second set of autocorrelation lags comprises lags 2 and 4.

8. A method for reducing clutter in received radar signals comprising the steps of:

storing a plurality of samples of said received radar signals in time sequence;

dividing said plurality of samples into a multiplicity of sample blocks, each block having at least two of said samples, said multiplicity of sample blocks having an initial block and an ultimate block;

providing an average clutter value of sampled received radar signals for each block, thereby providing an average clutter value for each sample block;

positioning said average clutter value for a block at a selected sample time position therein;

generating a smooth function passing through each of said average clutter values; and extrapolating, from said smooth function, clutter component values at each sampling time position; and subtracting said clutter component values from corresponding received radar signals, thereby providing clutter reduced radar signals.

9. The method of claim 8 wherein said sample time position is centered in said block.

10. The method of claim 8 wherein said smooth function has continuous first and second derivatives.

11. The method of claim 10 wherein said smooth function is a cubic spline having third order polynomial approximations between said selected time positions.

12. The method of claim 11 wherein said cubic spline has a zero first derivative from a first sample time position in said initial block to said selected sample time position in said initial block and a zero first derivative from said selected sample time position in said ultimate block to an ultimate sample time position in said ultimate block.

13. A method for reducing clutter in received radar signals having radar signal, clutter, and noise components comprising the steps of;

storing said received radar signals in time sequence;

determining said clutter components of said received radar signals;

respectively subtracting said clutter components from said received radar signals, thereby providing a clutter reduced radar signal providing autocorrelations of said clutter reduced radar signal for lags 1 and 3;

utilizing said autocorrelations for lags 1 and 3 for providing a first radar signal;

providing autocorrelations of said clutter reduced radar signal for lags 2 and 4;

utilizing said autocorrelations for lags 2 and 4 for providing a second radar signal;

determining a ratio of said first and second radar signals; and evaluating clutter component distortion of said radar signal from said ratio.

* * * * *